United States Patent [19]

Macleod

[11] 3,764,537
[45] Oct. 9, 1973

[54] SYNTHETIC PETROLATUM COMPOSITIONS

[76] Inventor: David M. Macleod, 835 Lakeshore Rd., Sarnia, Ontario, Canada

[22] Filed: Nov. 1, 1971

[21] Appl. No.: 194,492

Related U.S. Application Data

[62] Division of Ser. No. 16,980, March 5, 1970, Pat. No. 3,642,635.

[52] U.S. Cl. ............... 252/56 R, 252/11, 252/308, 260/28.5 AV, 424/83
[51] Int. Cl. ............................................. C10m 1/28
[58] Field of Search ................. 252/11, 52, 54.6, 252/56 R, 308, 316; 424/78, 83; 260/28.5 AV

[56] References Cited
UNITED STATES PATENTS

| | | | |
|---|---|---|---|
| 2,133,412 | 10/1938 | Anderson | 260/28.5 A |
| 2,628,187 | 2/1953 | Frohmader et al. | 252/56 R |
| 2,775,561 | 12/1956 | Frohmader et al. | 252/59 |
| 3,215,599 | 11/1965 | Thau et al. | 424/83 |

FOREIGN PATENTS OR APPLICATIONS

| | | |
|---|---|---|
| 976,716 | 12/1964 | Great Britain |
| 1,014,075 | 12/1965 | Great Britain |

Primary Examiner—Patrick P. Garvin
Assistant Examiner—W. Cannon
Attorney—Roy J. Ott

[57] ABSTRACT

Petrolatum-like products are prepared by combining a distillate lubricating oil, a slack wax derived from a distillate lubricating oil and a wax crystal modifying additive having an intrinsic viscosity in the range of about 0.05 to about 0.3 dl/g and selected from the group consisting of amorphous polyethylene, amorphous polypropylene, copolymers thereof, halogenated homopolymers and copolymers thereof, and copolymers of 3 to 40 molar proportions of ethylene per molar proportion of an ethylenically unsaturated monomer having the general formula:

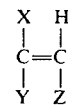

wherein X is selected from the group consisting of hydrogen, halogens and $C_1$ to $C_5$ alkyl groups; Y is selected from the group consisting of —OOCR, —OOCR and —COR groups; Z is selected from the group consisting of —COOR and —R; and R is selected from the group consisting of hydrogen and $C_1$ to $C_{10}$ alkyl groups.

8 Claims, No Drawings

SYNTHETIC PETROLATUM COMPOSITIONS

This is a division, of application Ser. No. 16980, filed Mar. 5, 1970 now U.S. Pat. No. 3,642,635.

BACKGROUND OF THE INVENTION

1. Field of the Invention

This invention relates to improved petrolatum-like products. More specifically, it relates to products prepared for distillate lubricating oil, distillate lubricating oil slack wax and a wax crystal modifying additive having an intrinsic viscosity in the range of about 0.05 to about 0.3 dl/g.

2. Description of the Prior Art

Natural petrolatums are unctuous mixtures of wax and oil derived from the residual fraction after distillation of certain crude oils. They are soft, oily, semisolids which have many uses including ink formulations, rubber compounding, protective waterproof coatings, leather dressings, medicinal ointments, etc. Their properties may be generally summarized as follows:

| | |
|---|---|
| Melting Point | 100°–180°F. |
| Cone Penetration at 77°F. | 75–200 mm/10 |
| Viscosity at 210°F. | 65–130 SUS |
| Flash Point | Above 350°F. |
| Color | Ranging from white to almost black |
| Crystallinity | Very fine structure |
| Fibrosity | Forms grease-like fibres when pulled |
| Extensibility | Long fibres usually formed |
| Recoil | Films of fibres do not tend to flow into drops or contract as liquid oil or rubber-like materials do. |

Natural petrolatums are in restricted supply and comparatively high in price. It would be desirable to manufacture petrolatums by mixing readily available and lower cost lubricating oils and lubricating oil slack waxes, but the properties of such mixtures do not match those of natural petrolatums.

Pour point depressants, otherwise know as wax crystal modifiers, are well known in the art. These modifiers have been formed by copolymerizing ethylene and vinyl esters of lower fatty acids, particularly vinyl acetate, as described for example in U.S. Pat. Nos., 3,048,479; 3,093,623 and 3,131,168; or by copolymerizing ethylene with alkyl acrylates as described in Canadian Patent No. 678,875 and U.S. Pat. No. 3,126,364.

Similarly, British Patent No. 993,744 discloses the use of polyethylene, polypropylene and copolymers thereof as pour point depressants, U.S. Pat. No. 3,337,313 discloses the use of halogenated pour point depressants and copending commonly assigned application Ser. No. 744,667, filed July 15, 1968, discloses the use of copolymers of ethylene with unsaturated ketones as pour point depressants. However, heretofore these wax crystal modifiers and similar compositions have not been successfully used in producing petrolatum-like products. Thus, small amounts of crystalline polyethylene, butyl rubber and high molecular weight ethylene-vinyl acetate copolymers have been found to alter the crystal size of wax-oil mixtures to match natural petrolatum, but the other properties were not satisfactory, e.g. cyrstalline polyethylene and high molecular weight ethylene-vinyl acetate copolymer failed to improve the brittleness and extensibility, and butyl rubber, while satisfactory in these respects, resulted in objectionable recoil.

Recently, British Patent No. 1,014,075 disclosed a composition comprising either ethylene propylene copolymer or vinyl acetate/ethylene copolymer (having an inherent viscosity in the range of 0.45 to 1.50) in combination with petroleum wax and oil for use as a protective coating. However, said components result in a poor quality petrolatum with crystalline, grainy wax particles. Furthermore, the fact that the composition was described as being capable of bleeding oil indicates that the compatibility of the components is poor.

U.S. Pat. No. 2,133,412 discloses the manufacture of petrolatum-like products from distillate paraffin wax, mineral oil and polyisobutylene having a molecular weight of 2,000 to 10,000. However, the resulting products of this patent are also characterized by crystalline, grainy wax particles and oil bleeding is observed when polyisobutylene having a molecular weight of about 2,000 are employed.

SUMMARY OF THE INVENTION

It has now been discovered that all of the aforementioned polymers and copolymers which are amorphous and which have an intrinsic viscosity in the range of about 0.05 to about 0.3 dl/g can be advantageously used to produce synthetic petrolatums. More specifically, it has now been discovered that good replacements for natural petrolatum are obtained by combining a distillate lubricating oil, a distillate lubricating oil slack wax and a crystal modifying additive, having an intrinsic viscosity in the range of about 0.05 to about 0.3 dl/g, and selected from the group consisting of amorphous polyethylene, amorphous polypropylene, copolymers thereof, halogenated homopolymers and copolymers thereof, copolymers of 3 to 40 molar proportions of ethylene per molar proportion of an ethylenically unsaturated monomer having the general formula:

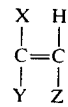

wherein X is selected from the group consisting of hydrogen, halogen and $C_1$ to $C_5$ alkyl groups; Y is selected from the group consisting of —OOCR, —COOR and —COR groups; Z is selected from the group consisting of —COOR and —R; and —R is selected from the group consisting of hydrogen and $C_1$ to $C_{16}$ alkyl groups and mixtures thereof. More particularly, it has been found that a combination of 15 to 50 wt. % distillate lubricating oil slack wax, 40 to 84 wt. % distillate lubricating oil and 1 to 20 wt. % of said crystal modifying additives can produce a synthetic petrolatum whose properties surpass those of any of the above mentioned synthetic products.

The distillate lubricating oils used in preparing the unctuous products of this invention are those distillate oils generally characterized by a boiling range of about 650°F. to about 1150°F. A.E.T. (atmospheric equivalent temperature) and a viscosity at 210°F. in the range of about 40 to 180 SUS. Preferred are those oils having a boiling range of about 850°F. to 1100°F. and a viscosity at 210°F. of about 70 to 160 SUS.

The wax component of this invention is generally a slack wax derived from a distillate lubricating oil having a boiling range of about 650°F. to 1150°F. A.E.T.

(atmospheric equivalent temperature). The wax itself has a melting point in the range of about 100°F. to about 170°F., an oil content of about 5 to about 50 percent, and a viscosity at 210°F. in the range of about 35 to about 80 SUS. Preferred is a wax having a melting point in the range of about 130°F. to about 165 F. and a viscosity at 210°F. in the range of about 55 to about 75 SUS, derived from a distillate oil having a boiling point in the range of about 800°F. to about 1100°F.

The crystal modifying additive of this invention must have an intrinsic viscosity in the range of about 0.05 to about 0.3, preferably 0.1 to about 0.29 dl/g, in order to produce a product having the desired characteristics.

Intrinsic viscosity was herein calculated from the following relationship in which specific viscosity was determined at 100°F. in toluene:

$$\text{Intrinsic viscosity} = \frac{\sqrt{2}}{\text{Conc. of Solution}} \times \sqrt{\text{specific viscosity} - \log_e \frac{\text{solution viscosity}}{\text{solvent viscosity}}}$$

Although the polymers useable as crystal modify-ing additives in accordance with this invention are low molecular weight polymers, use of actual molecular weight numbers in identifying the polymers has been found to be practically meaningless in specifying the type of polymer useful in accordance herewith. Molecular weight numbers are at most an extremely poor and inconclusive means of identifying the polymers. The methods which measure molecular weight directly, such as cryoscopic (e.g. Rast Method), ebulliscopic (e.g. Menzies-Wright Method) or osmometric techniques, are unreliable in the low molecular weight range of the useful polymers. The effects that must be measured by such techniques become progressively smaller as molecular weight increases, and error introduced by low molecular weight contaminants becomes important in such techniques as applied to lower molecular weight polymers. For example, using these techniques molecular weights for the same given polymer have differed twofold depending upon the molecular weight technique used.

For these reasons, the polymers are specified by means of physical properties such as intrinsic viscosity and crystallinity characteristics.

The amorphous polymers of this invention are generally characterized as having less than 20 percent crystallinity as determined by differential thermal analysis and a solubility in toluene at room temperature (e.g. 77°F.) greater than 25 percent.

Suitable amorphous polyethylene, amorphous polypropylene and amorphous copolymers of ethylene and propylene in any relative mole ratio may be prepared by the well-known Ziegler polymerization process, e.g. U.S. Pat. No. 3,051,690, or may be obtained as a commercially available chemical commodity. The halogenated homopolymers and copolymers thereof have a halogen weight content of about 4 to 35 percent, preferably 10 to 30 percent, based on the total weight of the halogenated polymer, and can be prepared by the chlorination methods described in U.S. Pat. No. 3,337,313. The preferred halogen is chlorine.

The copolymers of ethylene and an ethylenically unsaturated monomer which are useful for blending into the aforementioned waxes and oils are those having an ethylene content of about 3 to 40, preferably 3 to 20 molar proportions per molar proportion of monomer. The monomer, having the general formula:

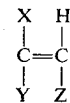

where X and Z are hydrogen and Y is —OOCR, includes vinyl alcohol esters of $C_2$ to $C_{17}$ monocarboxylic acids, preferably $C_2$ to $C_5$ monocarboxylic acids. Examples of such esters include vinyl acetate, vinyl isobutyrate, vinyl laurate, vinly myristate, vinyl palmitate, etc. When Y is —COOR, such esters include methyl acrylate, methyl methacrylate, isobutyl acrylate, lauryl acrylate, $C_{13}$ Oxo alcohol esters of methacrylic acid, etc. Examples of monomers where X is hydrogen and Y and Z are —COOR groups include mono and di-esters of unsaturated dicarboxylic acids such as: mono $C_{13}$ Oxo fumarate, di-$C_{13}$ Oxo fumarate, di-isopropyl maleate, di-lauryl fumarate, ethyl methyl fumarate, etc. When Y is —COR, said monomer includes vinyl methyl ketone, vinyl isobutyl ketone, vinyl n-octyl ketone, vinyl-isooctyl ketone, vinyl dodecyl ketone, vinyl-phenyl ketone, vinyl-naphthyl ketone, vinyl-cyclohexyl ketone, 3-pentene-2-one, (i.e. Z is methyl, X is hydrogen and Y is acetyl), etc. These copolymers can be prepared using the techniques used for ethylene-vinyl ester copolymerizations, e.g. by copolymerizing a mixture of monomer and ethylene in the presence of a suitable catalyst such as a peroxy compound like di-tertiary-butyl-peroxide at a temperature in the range of about 200° to about 300°F. and a pressure in the range of about 700 to 5000 pounds. Similarly, the methods described in U.S. Pat. Nos. 3,048,479; 3,131,168; 3,093,623; and 3,254,063; etc. can also be used.

The compositions of this invention can be prepared by methods known in the art which do not constitute a part of this invention. For example, the oil and wax can be premixed at a temperature in the range of about 220°F. to about 300°F. and then the crystal modifying additive can be added in solid or liquid form or all three components can be added simultaneously. The mixture is then agitated at the above temperatures for a period ranging from about 15 minutes to one hour and then cooled.

Generally the distillate lubricating oil will form about 40 to about 84, preferably 50 to about 70 wt. %, of the total composition; the distillate lubricating oil slack wax will form about 15 to about 50, preferably 20 to about 40 wt. % of the total composition; and the crystal modifying additive will form about 1 to about 20, preferably 3 to 10 wt. % of the total composition.

It is to be understood that while the compositions of this invention are usually produced by combining dewaxed distillate lubricating oils and distillate lubricating oil slack wax, it would be possible to produce the same compositions by taking an equivalent lubricating oil which has not been dewaxed (but which normally contains only about 10 percent wax) and adding additional slack wax in order to bring the total wt. % of the wax in the final composition within the range contemplated by this invention, and that a composition formed in this manner is contemplated in the scope of this invention.

DESCRIPTION OF THE PREFERRED EMBODIMENTS

The following examples, which are set forth for purposes of illustration and not limitation, may serve to illustrate the preparation and properties of certain preferred embodiments of this invention.

EXAMPLE 1

65 grams of distillate lubricating oil and 30 grams of distillate lubricating oil slack wax were placed in a laboratory mixer maintained at a temperature of 250°F. Five grams of amorphous polypropylene were then added and the mixture was agitated for 30 minutes. The product was then cooled to room temperature and set aside for testing.

In Table I are set forth certain preferred embodiments of this invention as well as comparative petrolatum compositions. The compositions were all prepared using the procedure described in Example 1, which was presented above in greater detail for illustration purposes.

vinyl acetate content of 32 percent and an intrinsic viscosity of 0.261 dl/g.

(Crystalline) Polyethylene A (Canadian Industries Ltd., Grade 170 F) has a density of 0.919, a melt index of 8.5, a molecular weight of about 12,000 to about 20,000 by viscosity average method, an intrinsic viscosity of 0.391 and a solubility in toluene at 77°F. of less than 1 percent.

(Crystalline) Polyethylene B (Allied Chemical Grade AC6) has a density of 0.92, a molecular weight quoted by the manufacturer as 2000, an estimate molecular weight by viscosity average method of 2000, an intrinsic viscosity of about 0.159 dl/g and a solubility in toluene at 77°F of less than 1 percent.

Ethylene vinyl acetate Copolymer B (used in comparative Petrolatum D and purchased under the trade name Elvax 150) has an intrinsic viscosity of 0.761 dl/g and is the same as that used in the working examples of British Patent No. 1,014,075.

The ethylene-propylene copolymer of comparative Petrolatum E was purchased under the trade name of Vistalon 404 and has an intrinsic viscosity of about 1.421 dl/g. (which is within the range mentioned on

TABLE 1

| Components | Example 1 | Example 2 | Comparative petrolatums | | | | | | | Example 3 | Example 4 |
|---|---|---|---|---|---|---|---|---|---|---|---|
| | | | A | B | C | D | E | F | G | | |
| | (g) | (g) | (g) | (g) | (g) | (g) | (g) | (g) | (g) | (g) | (g) |
| Oil A | 65 | 65 | 68 | 65 | 69.5 | 65 | 68 | 65 | 65 | 65 | 65 |
| Wax A | 30 | 30 | 30 | 30 | 30 | 30 | 30 | 30 | 30 | 30 | 30 |
| Amorphous polypropylene | 5 | ... | ... | ... | ... | ... | ... | ... | ... | ... | ... |
| Ethylene/vinyl acetate copolymer A | ... | 5 | ... | ... | ... | ... | ... | ... | ... | ... | ... |
| (Crystalline) polyethylene A | ... | ... | 2 | ... | ... | ... | ... | ... | ... | ... | ... |
| (Crystalline) polyethylene B | ... | ... | ... | 5 | ... | ... | ... | ... | ... | ... | ... |
| Butyl rubber | ... | ... | ... | ... | 0.5 | ... | ... | ... | ... | ... | ... |
| Ethylene/vinyl acetate copolymer B | ... | ... | ... | ... | ... | 5 | ... | ... | ... | ... | ... |
| Ethylene propylene copolymer | ... | ... | ... | ... | ... | ... | 2 | ... | ... | ... | ... |
| Polyisobutylene A | ... | ... | ... | ... | ... | ... | ... | 5 | ... | ... | ... |
| Polyisobutylene B | ... | ... | ... | ... | ... | ... | ... | ... | 5 | ... | ... |
| (Amorphous) polyethylene C | ... | ... | ... | ... | ... | ... | ... | ... | ... | 5 | ... |
| Ethylene/isobutyl acrylate copolymer | ... | ... | ... | ... | ... | ... | ... | ... | ... | ... | 5 |

The following is a detailed description of the components used in making the compositions of Table I.

Oil A is a distillate lubricating oil from Western Canadian Crude. It has a viscosity at 100°F. of 3600 SUS, a viscosity index of 70, a boiling range of 900°F. to 1100°F. A.E.T., a solid point of 20°F. and a viscosity at 210°F. of 155 SUS.

Wax A is a slack wax from an overhead fraction derived from Western Canadian Crude having a boiling range of 900°F. to 1100°F. A.E.T. The wax has a melting point of 160°F., a viscosity at 210°F. of 75 SUS, an oil content of 20 percent and a cone penetration of 26 mm/10.

Amorphous polypropylene (Grade Eastobond M5L) has a ring and ball softening point of 198°F., a melting viscosity of 3000 cp at 300°F., an estimated molecular weight of 8000 by viscosity average method and an intrinsic viscosity of 0.273 dl/g.

Ethylene vinyl acetate Copolymer A used in Example 2 has a melt index above 5000, a molecular weight of about 2000 to about 3000 by cryoscopic methods, a page 2, lines 3–5 of British Patent No. 1,014,075).

Polyisobutylene A has an intrinsic viscosity of 0.250 and a molecular weight ranging from about 8,000 to 10,000.

Polyisobutylene B has an intrinsic viscosity of 0.056, a molecular weight of about 2000 and is sold under the trade name Petrofin 2000.

(Amorphous) polyethylene C of Example 3 is a polyethylene homopolymer product from the peroxide catalyzed polymerization of ethylene. It has a number average molecular weight of about 2000, an intrinsic viscosity of about 0.113 dl/g and a solubility in toluene at 77°F. greater than 25%.

The ethylene isobutyl acrylate copolymer used in Example 4 has a number average molecular weight of about 3300 and an intrinsic viscosity of about 0.237 dl/g. It was prepared by the free radical peroxide copolymerization of 7.2 moles ethylene per mole of isobutyl acrylate.

The properties of the above synthetic petrolatums of Table I and natural petrolatum are shown in Table II.

TABLE II

| Composition | Intrinsic Visc. of crystal modifying agent, dl/g | Viscosity at 210° F. SUS | Cone penetration 77° F. mm/10 | Crystallinity | Fibrosity | Extensibility | Recoil | Oil bleeding |
|---|---|---|---|---|---|---|---|---|
| Example 1 | 0.273 | 220 | 120 | Microcrystalline | Fibrous | Large | None | None. |
| Example 2 | 0.261 | 120 | 120 | Microcrystalline | Fibrous | Large | None | None. |
| Natural petrolatum | | 88 | 180 | Microcrystalline | Fibrous | Large | None | None. |
| Comparative petrolatum A | 0.391 | 300 | 83 | Microcrystalline | Brittle | Small | None | None. |
| Comparative petrolatum B | 0.159 | 120 | 78 | Microcrystalline | Brittle | Small | None | None. |
| Comparative petrolatum C | | 150 | 110 | Microcrystalline | Fibrous | Large | Large | None. |
| Comparative petrolatum D | 0.761 | | | Crystalline | Grainy | None | None | Slight. |
| Comparative petrolatum E | 1.421 | | | Microcrystalline | Rubbery | Very Large | Very Large | None. |
| Comparative petrolatum F | 0.250 | | | Crystalline | Grainy | None | None | None. |
| Comparative petrolatum G | 0.056 | | | Crystalline | Grainy | Slight | None | Slight. |
| Example 3 | 0.113 | | | Microcrystalline | Fibrous | Large | None | None. |
| Example 4 | 0.237 | | | Microcrystalline | Fibrous | Large | None | None. |

TABLE III. — Comparison of Petrolatum With Wax-Oil Mixtures

| | Properties | | | | |
|---|---|---|---|---|---|
| Composition | Cone pen. at 77° F. mm/10 | Crystallinity | Fibrosity | Extensibility | Recoil |
| Natural petrolatum [1] | 180 | Microcrystalline. | Fibrous | Large | None. |
| 50% wax A, 50% oil A | 70 | Large crystals | Grainy | Small | None. |
| 30% wax A, 70% oil A | 110 | Large crystals | Grainy | Small | None. |
| 10% wax A, 90% oil A | 198 | Large crystals | Grainy | Small | None. |

[1] Petrolatum—Residual fraction, M.P. 120° F., Viscosity at 210° F. 88 SUS, Oil Content 50%.

TABLE IV. — Use of Different Distillate Oils and Waxes With Amorphous Polypropylene

| Composition | Vis. at 210° F. SUS | Congealing pt. °F. | Cone pen. at 77° F. mm/10 | Crystallinity | Fibrosity | Extensibility | Recoil | Oil bleeding | Color. |
|---|---|---|---|---|---|---|---|---|---|
| 30% wax B,[1] 65% oil A, 5% amorphous polypropylene. | 179 | 134.0 | 120 | Microcrystalline. | Fibrous | Large | None | None | Dark brown. |
| 30% wax B, 65% oil B,[2] 5% amorphous polypropylene. | 149 | 133.0 | 124 | Microcrystalline. | Fibrous | Large | None | None | Dark brown. |
| 30% wax B, 65% oil C,[3] 5% amorphous polypropylene. | 125 | 131.0 | 123 | Microcrystalline. | Fibrous | Large | None | None | Light yellow. |

[1] Distillate wax B — A slack wax from an overhead fraction, derived from Western Canadian Crude. Boiling range 800 to 1000° F., AET( MP 150° F., Viscosity at 210° F., 63 SUS, Oil content 20%, Cone pen. 26 mm/10.
[2] Distillate oil B — From Western Canadian Crude. Viscosity at 100° F., 550 SUS, VI 90. Boiling range 800 to 1000° F., AET, Solid point +20° F., Viscosity at 210° F., 72 SUS.
[3] Distillate oil C — Derived from Tia Juana 102 Crude Oil, viscosity at 100° F., 900 SUS, VI 68. Boiling range 850 to 1050° F., AET, Solid point +20° F., Viscosity at 210° F., 80 SUS.

As can be seen from Table II, only the compositions of this invention exhibit all of the properties of natural petrolatum. The use of crystalline polyethylenes A and B resulted in petrolatum of inferior fibrosity and extensibility; the use of butyl rubber resulted in objectional recoil; the use of an ethylene/vinyl acetate copolymer B having an inherent viscosity between 0.45 and 1.50 for 0.25 wt. % copolymer in toluene at 30°C. (which is equivalent to an intrinsic viscosity range of 0.53 to 1.59 dl/g) as disclosed in British Patent No. 1,014,075 resulted in crystalline grainy wax particles and slight oil bleeding; the use of ethylene propylene copolymer of the type disclosed in the British patent, having an intrinsic viscosity outside of the critical range, resulted in objectional fibrosity and recoil; and the use of polymerized isobutylene of the type disclosed in U.S. Pat. No. 2,133,412 resulted in a petrolatum with grainy crystalline particles which exhibited slight oil bleeding when the lower molecular weight polymer was used.

That simple mixtures of oil and wax will not exhibit the properties of natural petrolatum can be seen from Table III.

Thus, from Table III it can be seen that the crystallinity and rheological properties of unmodified wax-oil mixtures are quite different from those of the natural petrolatum, even when the proportions of wax and oil are adjusted to equal the softness, or penetration, of the petrolatum. The same effect is found with other waxes and oils of different melting points and lubricating oil boiling ranges.

EXAMPLES 5, 6 and 7

In accordance with the procedure of Example 1, three additional 100 gm petrolatum compositions were prepared using amorphous polypropylene and different distillate lubricating oils and waxes. The resulting products and their properties, which are the same as natural petrolatum, are shown in Table IV.

While particular embodiments of this invention are shown in the examples, it will be understood that the invention is obviously subject to the variations and modifications disclosed above without departing from its broader aspects and, therefore, it is not intended that the invention be limited to the specific modifications which have been given above for the sake of illustration, but only by the appended claims.

What is claimed is:

1. A synthetic petrolatum composition comprising:
   a. about 40 to about 84 wt. % distillate lubricating oil;
   b. about 15 to about 50 wt. % distillate lubricating oil slack wax; and
   c. about 1 to about 20 wt. % of a crystal modifying additive having an intrinsic viscosity in the range of about 0.05 to about 0.3 dl/g and selected from the group consisting of copolymers of 3 to 40 molar proportions of ethylene per molar proportion of an ethylenically unsaturated ester having the general formula:

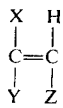

wherein X is selected from the group consisting of hydrogen, and $C_1$ to $C_5$ alkyl groups; and Y is selected from the group consisting of —OOCR and —COOR where R is $C_1$ to $C_{10}$ alkyl.

2. The composition of claim 1, wherein said lubricating oil has a boiling range of about 650°F. to about 1150°F. A.E.T. and a viscosity at 210°F. in the range of about 40 to about 180 SUS and said wax is a slack wax having a melting point in the range of about 100°F. to about 170°F. and a viscosity at 210°F. in the range of about 35 SUS to about 80 SUS. derived from a distillate lubricating oil having a boiling range of about 650°F. to about 1150°F. A.E.T.

3. The composition of claim 1, wherein component (a) represents about 50 to about 70 wt. %, component (b) represents about 20 to about 40 wt. %, and component (c) represents about 3 to about 10 wt. % of the total composition.

4. The composition of claim 1, wherein said crystal modifying additive is characterized by an intrinsic viscosity in the range of about 0.1 to about 0.29 dl/g.

5. The composition of claim 1, wherein said crystal modifying additive is a copolymer containing 3 to 20 molar proportions of ethylene per molar proportion of said ethylenically unsaturated ester.

6. The composition of claim 5, wherein said ester is a vinyl alcohol ester.

7. The composition of claim 6, wherein said ester is a vinyl alcohol ester of $C_2$ to $C_5$ monocarboxylic acid.

8. The composition of claim 7, wherein said ester is vinyl acetate.

* * * * *